Oct. 28, 1969  R. M. VOITIK  3,475,033
LIQUID SENSING SEAL FOR ROTATING SHAFT
Filed Dec. 1, 1967  2 Sheets-Sheet 1
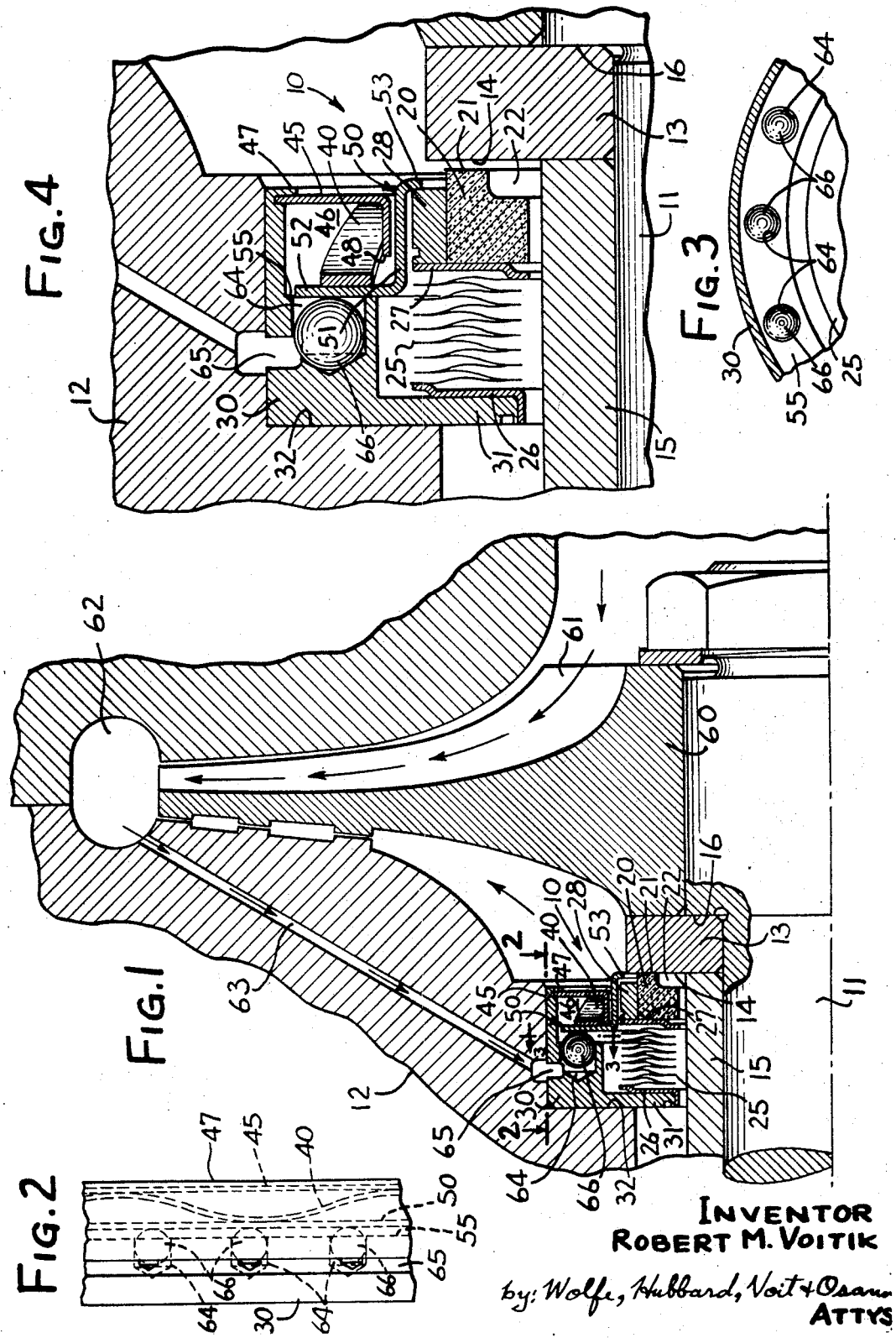
INVENTOR
ROBERT M. VOITIK
by: Wolfe, Hubbard, Voit + Osann
ATTYS

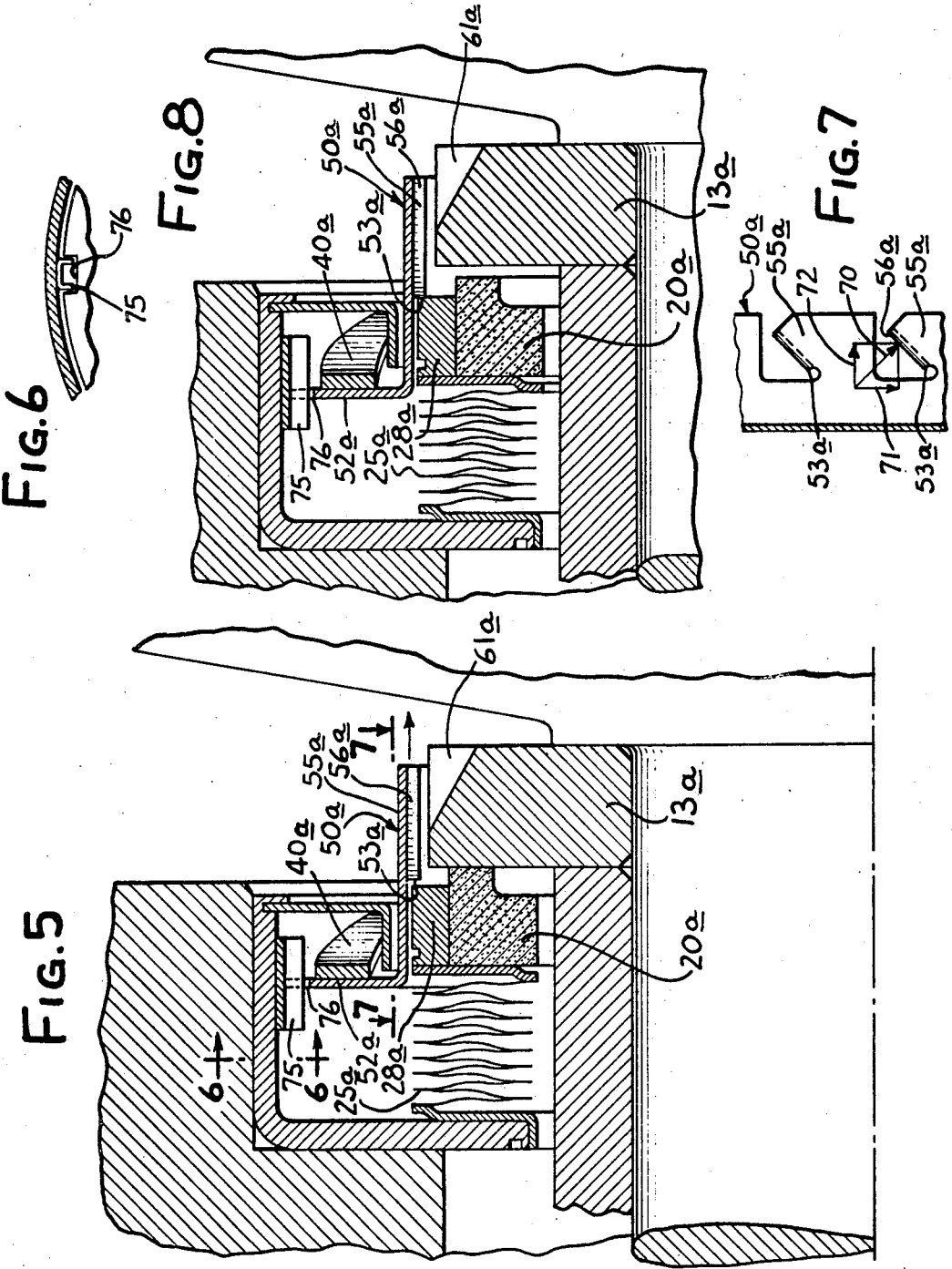

United States Patent Office 3,475,033
Patented Oct. 28, 1969

3,475,033
LIQUID SENSING SEAL FOR ROTATING SHAFT
Robert M. Voitik, Glenview, Ill., assignor to Continental Illinois National Bank and Trust Company of Chicago, Trustee under the Cartridge Type Seal Liquidation Trust
Filed Dec. 1, 1967, Ser. No. 687,182
Int. Cl. F16j 15/36, 15/54
U.S. Cl. 277—28    10 Claims

ABSTRACT OF THE DISCLOSURE

A sealing assembly for sealing a shaft with respect to a liquid contained in a housing in which means are provided for separating the sealing surfaces to prevent the seal from running dry in the dry condition, and in which the liquid, when present, is acted upon to produce a pressure head which is used to bring the sealing surfaces into normal sealing engagement. In one embodiment the pressure head is used to pressurize fluid actuators to bring the stator into contact with the rotor while in a second embodiment the liquid acts directly upon vanes to bring about the desired stator movement.

---

It is an object of the present invention to provide a shaft sealing assembly for sealing a liquid in a housing and which includes provision for retraction of the sealing members in the absence of liquid to prevent wear under dry running conditions. It is another object to provide a sealing assembly which is automatically operable to shift between a normal running condition and a condition in which the sealing elements are separated from one another which is positive in operation and which can be relied upon even in the most exacting applications. It is a related object to provide a sealing assembly having a long useful life under conditions which have in the past resulted in accelerated wear.

It is still another object of the present invention to provide an automatic liquid-responsive shaft sealing assembly which is nonetheless simple and straightforward and which can be manufactured economically; in one version the manufacturing cost is only slightly greater than seals not possessing the automatic separation feature.

It is a further object of the present invention to provide a sealing assembly which is actuated in the presence of liquid but in which the sealing force does not vary with the amount of liquid, density of the liquid, or speed of the shaft and which therefore insures optimum sealing over a wide range of operating conditions.

Other objects and advantages of the invention will become apparent upon reading the attached detailed description and upon reference to the drawings in which:

FIGURE 1 is an axial section taken through a sealing assembly constructed in accordance with the present invention but with the upper half of the assembly only being shown;

FIG. 2 is a fragmentary section looking along the line 2—2 in FIG. 1;

FIG. 3 is a fragmentary section looking along the line 3—3 in FIG. 1;

FIG. 4 is an enlarged fragmentary portion of FIG. 1 showing the sealing surfaces separated under dry running conditions;

FIG. 5 is an axial section showing a modified form of the present invention;

FIG. 6 is a fragmentary section looking along the line 6—6 in FIG. 5;

FIG. 7 is a fragmentary view showing the profile of the fluid actuated vanes; and FIG. 8 is a view similar to FIG. 5 but showing the sealing surfaces separated from one another.

With the invention has been described in connection with certain preferred embodiments, it will be understood that I do not intend to be limited to the particular embodiments shown but, on the contrary, I intend to cover the alternaive and equivalent forms of the invention included within the spirit and scope of the appended claims.

Turning now to FIGURE 1 of the drawings, there is shown a sealing assembly 10 for sealing a shaft 11 with respect to housing structure 12. The shaft has a rotor 13 with an axially facing sealing surface 14, the rotor being held in place on the shaft by a sleeve 15 which clamps the rotor against a shoulder 16.

Arranged opposite the face of the rotor is an annular stator element 20 preferably formed of anti-friction material and having a face 21 which is relieved, as at 22, to define an annular sealing area. For the purpose of sealing the element 20 with respect to the housing while permitting it to move endwise through a limited range of movement, the element is connected to a bellows 25 having mounting flanges 26, 27, the flange 27 being connected to a metal reinforcing ring 28 which snugly embraces the sealing element.

The bellows and sealing ring are preferably mounted within an annular cartridge 30 which has an inwardly extending flange or wall 31 and which is press fitted into a receptacle 32 machined in the housing.

In accordance with the present invention means are provided for biasing the sealing element 20 into running engagement with the rotor 13 on the shaft under normal running conditions with liquid present and for causing the sealing element to be automatically retracted to prevent wear in the absence of liquid. To provide the light biasing force required for sealed running, the bellows 25 is made of resilient material and of a free length which is slightly greater than the space which it normally occupies so that it is constantly in a slightly compressed state. In order to break the sealing contact when the shaft is rotated under dry conditions, a wave spring 40 is provided which is seated on one side with respect to the housing and which is coupled on its opposite side to the sealing element, the force of the wave spring being sufficiently great so that the normal bias provided by the bellows is overcome, causing the sealing element to be moved to the separated position shown in FIG. 4. The spring 40 is seated upon an annular mounting flange 45 which encloses a space 46 in the cartridge and which is held captive, about its periphery, by a lip 47 formed on the edge of the cartridge. The inner edge of the flange is turned inwardly to provide a stop surface 48. For the purpose of coupling the wave spring 40 to the sealing element, a force transmitting ring 50 is used which surrounds the sealing element having a cylindrical portion 51 and a radially extending flange 52. An inwardly turned flange 53 at the end of the portion 51 serves as an axially facing abutment for obstructively engaging the periphery of the ring 28 which surrounds the sealing element. Movement of the ring axially under the influence of the wave spring 40 is limited by an internal face 55 in the cartridge. Thus, under dry running conditions, the wave spring 40, pressing against the annular seat 45, exerts a force upon the flange 52, moving it to the left until it bottoms against the face 55. During the course of such movement the inwardly turned abutment 53 engages the ring 28 causing the sealing ring to be pulled away from the rotor against the force of bias exerted by the bellows.

In accordance with the invention an impeller is provided for centrifugally acting upon the liquid in the housing for creating a pressure head as the rotor revolves, and means are further provided for transmitting the pressure hydraulically to the wave spring to compress and defeat the wave spring so that the sealing element is free to move into normal sealing engagement with the rotor.

For creating a pressure head in the presence of liquid an impeller 60 is mounted adjacent the rotor 13, the impeller being formed with radially extending passageways 61 for pumping of the liquid in the direction of the arrows. To confine the liquid so as to create a pressure head, an annular pressure chamber 62 extends around the impeller having a passage 63 which communicates with the cartridge seal. In order to convert the pressure in the passage 63 to axial movement for compressing and defeating the wave spring 40, the cartridge has fluid actuators in the form of a number of miniature hollow cylinders 64, which are axially drilled into the face 55 of the cartridge at equally spaced intervals as shown in FIGS. 2 and 3. An intersecting annular groove 65 formed in the cartridge serves to provide fluid interconnection between the base portions of the individual cylinders 64. Fitted in each of the cylinders is a piston 66 which is preferably in the form of a finely machined ball of the type used in a ball bearing. The cylinders are preferably of such depth as to accommodate the balls to permit the flange 52 to seat flatly against the internal face 55 under dry running conditions.

It will be apparent, then, that with the shaft 11 rotating at its intended speed and with the housing dry, no pumping of liquid can occur through the passageways 61 of the impeller so that no head of pressurized liquid can exist in the pressure chamber 62. Any pressure against the balls 65 will not be sufficient to compress the wave spring 40, and the wave spring will continue to hold the sealing element 20 separated from the rotor as shown in FIG. 4. Under such conditions it is apparent that no wear can occur at the sealing surfaces even with extended running in the dry condition.

However, upon admission of liquid into the housing, centrifugal force tends to sling the liquid outwardly through the passageways 61 creating a pressure head in the annular chamber 62 which, conveyed through the communication passage 63, is applied to the balls 65. Since the flange 52 tends to distribute the opposing force of the wave spring 40 equally about the periphery, each of the balls will move outwardly, to the right, by an equal amount thereby moving the inwardly turned abutment 53 away from obstructing position and permitting the sealing ring 20 to seat against the face 14 of the rotor. This produces a liquid seal between the shaft and the housing preventing escape of liquid from the housing or passage of fluid into the housing. Movement of the balls is limited by bottoming of the ring 50 on the stop surface 48.

It is one of the features of the present invention that the liquid which is acted upon centrifugally serves only to disable the biasing spring 40 to enable the bias in the bellows itself to take over control. Thus the biasing force at the sealing surfaces is a matter of engineer's choice and is not dependent upon the amount of liquid in the housing, the specific gravity of such liquid, or the speed of rotation of the shaft.

While the invention has been described in connection with a preferred embodiment, a somewhat more economical embodiment is shown in the remaining figures, in which corresponding elements have been indicated by corresponding reference numerals with the addition of subscript "a." In this embodiment the pressure chamber and miniature fluid actuators are dispensed with and vanes are integrally provided on the force transmitting ring 50a to be acted upon directly by the axial pressure component of the pumped liquid. Thus in the embodiment shown in FIGS. 5–8 the ring 50a is provided with vanes 55a (see FIG. 7) having inwardly bent edges 56a which are arranged at an angle to the axis. The ends 53a of the inwardly bent edges serve as abutments for engaging the reinforcing ring 28a which extends about the annular sealing element. For the purpose of pumping the liquid outwardly and tangentially against the vanes, the rotor 13a is formed with slots for passageways 61a.

In operation, then, the flange 52a of the ring is forced to the left by the wave spring 40a. Under dry conditions, as shown in FIG. 8, the abutments 53a engage the ring 28a moving the sealing element 20a to the left, lifting it, against the force of the bellows 25a, clear of the rotor 13a. Upon admission of liquid to the housing, rotation of the shaft causes centrifugal pumping through grooves or passageways 61a formed in the rotor so that the liquid is directed against the inwardly turned edges 56a of the vanes. In this embodiment the radial component of force is balanced out, and it is the tangential force acting normal to the edges 56a of the vanes, which is significant. Because of the angling of the edges of the vanes, the tangential force 70, acting normal to the inturned edges 56a of the vanes produces a peripheral component 71 and an axial component 72 which is directed to the right in the drawing. For the purpose of nullifying the peripheral force 71, the ring 50a is prevented from rotating by a stop 75 which engages a registering notch 76 formed in the flange.

The forces 72, axially exerted upon each of the vanes, are cumulative and evenly distributed, causing the ring 50a to move to the right, compressing, and thereby defeating, the biasing spring 40a and lifting the abutments 53a clear of the ring 28a. This releases the sealing ring 20a so that it is free to move into normal sealing and running engagement with the rotor under influence of the bias from the bellows 25a.

It will be apparent that the embodiment disclosed in FIGS. 5–8 is inherently simple and inexpensive. The rotor conventionally provided on a shaft may be easily machined to form pumping grooves 61a, and it is a simple matter to form the ring 50a with integral shallow vanes to derive the axial component of force serving to switch the assembly from its normal running condition in the presence of liquid to its dry running condition with the surfaces disengaged.

The value of the invention, in preventing dry wear, depends to some extent upon the materials used for the rotor and stator. The rotor is generally made of steel. Where it is possible to use a stator made of material having long wearing, anti-friction properties even when operated in the dry condition, the improvement brought about by the invention may be relatively limited. However, it is often necessary to make compromises in the design of the seal resulting in the selection of a material in the sealing element which has good running life in the presence of a lubricating liquid but which exhibits aggravated wear when operated dry for extended periods. It is under such conditions that the present invention is of particular importance. Thus the term "anti-friction" in the following claims includes materials having a wide range of friction coefficient. In the first embodiment a pressure chamber is provided in the housing structure for confining the pressurized liquid while in the second embodiment the vanes are directly acted upon by a liquid stream. In both of these embodiments the force transmitting ring can be considered to be responsive to a pressure "head" so that the latter term, as employed in the claims, is intended to cover what is normally referred to as a velocity head. Moreover, while the claims have for simplicity referred to the problem of containing a liquid within a housing, it will be apparent that the terms "inside" and "outside" are relative in that either the left or right-hand sides of FIGS. 1 and 5 can be considered as the 'inside" of the housing.

While the use of individual pistons is preferred in the modification of FIGS. 1–4, particularly in the larger sizes, a single piston of annular shape may be used, having a cross section for example as indicated at 66, and fitted into a groove, as indicated at 64, which extends circularly about the axis of the shaft. In such modification the piston moves bodily in response to pressure to overcome the force of the wave spring 40 thereby to move the force transmitting ring 50 out of its obstructing position.

I claim as my invention:

1. A shaft seal for sealing a rotating shaft having an axially facing rotor with respect to liquid contained in a housing comprising, in combination, an annular stator element of anti-friction material having a sealing face for engaging the rotor, means including a bellows for sealingly mounting the stator with respect to the housing and for exerting a light biasing force to produce normal running engagement of the stator against the rotor, a force transmitting ring surrounding the stator, said ring being mounted for limited axial movement, obstructively coupled to the stator and means including a biasing spring for urging the ring in a direction to unseat the stator from the rotor under conditions of dry running, means for acting upon liquid in the housing to build up a pressure head as the shaft revolves in presence of liquid, actuator means having piston means axially facing the ring and in fluid communication with the pressurized liquid so that when the shaft revolves in the presence of liquid in the housing the piston means moves to overcome the force of the biasing spring and to move the ring out of obstructive engagement with the stator thereby permitting the stator to assume its position of normal running engagement with the rotor.

2. A shaft seal for sealing a rotating shaft having an axially facing rotor with respect to liquid contained in a housing comprising, in combination, an annular stator element of anti-friction material having a sealing face for engaging the rotor, means for sealing the stator with respect to the housing while permitting limited axial movement thereof, means associated with the rotor for acting upon liquid in the housing to create a pressure head as the rotor revolves, means for biasing the stator in a direction away from the rotor, and means responsive to the pressure head for causing the stator to move into sealing engagement with the rotor to prevent escape of the liquid, the biasing force being sufficiently low as to be readily overcome by the pressure head when the shaft is rotated at its intended speed but sufficiently high so that upon cessation of the pressure head in the absence of liquid in the housing the stator is moved free of the rotor for prevention of dry wear at the sealing surfaces.

3. A shaft seal for sealing a rotating shaft having an axially facing rotor with respect to liquid contained in a housing comprising, in combination, an annular stator element of anti-friction material having a sealing face for engaging the rotor, means for sealing the rotor with respect to the housing while permitting limited axial movement thereof, a first biasing spring for biasing the stator against the rotor, a second biasing spring stronger than the first biasing spring and arranged in opposition thereto so that in the absence of liquid in the housing the stator is moved away from the rotor for prevention of dry wear, means associated with the rotor for acting upon liquid in the housing to create a pressure head as the rotor revolves in the presence of liquid, and means responsive to the pressure head for disabling the second biasing spring so that the stator is free to move against the rotor under the influence of the first biasing spring when liquid is present in the housing.

4. A shaft seal for sealing a rotating shaft having an axially facing rotor with respect to liquid contained in a housing comprising, in combination, an annular stator element of anti-friction material having a sealing face for engaging the rotor, means including a bellows for sealing the stator with respect to the housing while permitting limited axial movement of the stator, said bellows being constructed of resilient material and so arranged that the stator is urged by the force of the bellows into normal sealing engagement with the rotor, a biasing spring for overcoming the force of bias of the bellows so arranged that the stator is moved free of the rotor to prevent wear at the sealing surfaces in the absence of liquid in the housing, means associated with the rotor for acting upon liquid in the housing for creating a pressure head as the rotor revolves in the presence of liquid, means responsive to the pressure head for disabling the biasing spring so that in the presence of liquid the stator is free to move into contact with the rotor under the biasing force of the bellows.

5. A shaft seal for sealing a rotating shaft having an axially facing rotor with respect to liquid contained in a housing comprising, in combination, an annular stator element of anti-friction material having a sealing face for engaging the rotor, means for sealing the stator with respect to the housing while permitting limited axial movement thereof, means including an impeller adjacent the rotor for causing liquid in the housing to develop a pressure head as the shaft revolves in the presence of liquid, means responsive to the pressure head of the liquid for causing the stator to move into sealing engagement with the rotor to prevent escape of the liquid, and means including a spring for biasing the stator in a direction away from the rotor so that in the absence of a pressure head of liquid the stator is free to move away from the rotor for prevention of dry wear at the sealing surfaces.

6. A shaft seal for sealing a rotating shaft having an axially facing rotor with respect to liquid contained in a housing comprising, in combination, an annular stator element for anti-friction material having a sealing face for engaging the rotor, means including a bellows for sealing the stator with respect to the housing while permitting limited axial movement thereof with the stator being biased against the rotor, a ring having an outwardly extending flange and surrounding the stator, a wave spring seated with respect to the housing for bearing against the flange, said ring having an abutment arranged to engage the stator as the ring moves axially under the urging of the wave spring thereby to unseat the stator from the rotor, means associated with the rotor for acting upon the liquid in the housing for creating a pressure head as the rotor revolves in the presence of liquid, means for transmitting the pressure of the pressure head to the ring for movement of the ring axially against the wave spring thereby to disable the wave spring to permit the stator to move into sealing engagement with the rotor.

7. A shaft seal for sealing a rotating shaft having an axially facing rotor with respect to a liquid contained in a housing comprising, in combination, an annular stator element of anti-friction material having a sealing face for engaging the rotor, means for sealing the stator with respect to the housing while permitting limited axial movement thereof, an impeller associated with the rotor for centrifugally acting upon the liquid in the housing as the rotor revolves, means defining an annular chamber in the housing surrounding the impeller for trapping the liquid and for building up a pressure head, fluid actuator means coupled to the stator and in fluid communication with the chamber so that the stator is cased to seatingly engage the rotor in the presence of pressurized liquid in the chamber, and a biasing spring for biasing the stator away from the rotor, the force of the biasing spring being sufficiently low as to be readily overcome by the fluid actuator means but sufficiently high so that upon cessation of the pressure head the stator is moved free of the rotor for prevention of dry wear at the sealing surfaces.

8. A shaft seal for sealing a rotating shaft having an axially facing rotor with respect to liquid contained in a housing comprising, in combination, an annular stator element of anti-friction material having a sealing face for engaging the rotor, means for sealing the stator with respect to the housing while permiting limited axial movement thereof, an impeller associated with the rotor for centrifugally acting upon liquid in the housing, means defining an annular pressure chamber surrounding the impeller for confining the liquid and thereby building up a pressure head, means defining a plurality of miniature axially extending cylinders spaced about the stator and in fluid communication with the pressure chamber, pistons in said cylinders, means for coupling the pistons to the stator so arranged that the pressure in the chamber is effective to cause the stator to move into sealing engagement with the rotor, and means including a biasing spring for pressing the pistons inwardly in the absence of fluid pressure accompanied by movement of the stator away from the rotor to prevent wear at the sealing surfaces under conditions of dry running.

9. The combinations as claimed in claim 8 in which the pistons are in the form of balls fitted slideably in the respective cylinders.

10. A shaft seal for sealing a rotary shaft having an axially facing rotor with respect to liquid contained in a housing comprising, in combination, an annular stator element of anti-friction material having a sealing face for engaging the rotor, means for sealing the stator with respect to the housing while permitting limited axial movement thereof and for applying a light biasing force urging the stator against the rotor, a ring surrounding the stator and having abutment means for obstructively engaging the stator, a biasing spring seated with respect to the housing and arranged to press against the ring so that the abutment means engages the stator for forceably retracting the stator from the rotor under dry running conditions, an impeller associated with the rotor for flinging liquid in the housing outwardly and tangentially as the shaft rotates, and means including vanes coupled to the ring so angled as to cause movement of the ring against the biasing spring and disengagement of the abutment means from the stator thereby permitting the stator to assume its position of normal running engagement with the rotor.

References Cited

UNITED STATES PATENTS

| | | | |
|---|---|---|---|
| 1,947,017 | 2/1934 | McHugh | 277—28 |
| 2,249,930 | 7/1941 | Bailey et al. | 277—42 |
| 2,389,528 | 11/1945 | McConaghy | 277—90 |
| 2,706,651 | 4/1955 | Hornschuch | 277—28 |

SAMUEL ROTHBERG, Primary Examiner

U.S. Cl. X.R.

103—111; 277—42